United States Patent [19]
Chesley

[11] Patent Number: 5,687,183
[45] Date of Patent: Nov. 11, 1997

[54] MEMORY ACCESS SYSTEM WITH OVERWRITE PREVENTION FOR OVERLAPPING WRITE OPERATIONS

[75] Inventor: Gilman Chesley, Santa Cruz, Calif.

[73] Assignee: Sun Microsystems, Inc., Mountain View, Calif.

[21] Appl. No.: 766,980

[22] Filed: Dec. 16, 1996

Related U.S. Application Data

[63] Continuation of Ser. No. 646,002, May 7, 1996, abandoned, which is a continuation of Ser. No. 350,720, Dec. 7, 1994, abandoned, which is a continuation of Ser. No. 809,667, Dec. 18, 1991, abandoned.

[51] Int. Cl.[6] .................. G06F 11/00; G06F 11/26
[52] U.S. Cl. .............. 371/41; 395/182.04; 395/185.04
[58] Field of Search .................. 395/425, 250, 395/550, 800, 182.03, 470, 821; 345/190; 371/41

[56] References Cited

U.S. PATENT DOCUMENTS

| | | | |
|---|---|---|---|
| 4,789,925 | 12/1988 | Lahti | 395/800 |
| 5,019,965 | 5/1991 | Webb, Jr. et al. | 395/445 |
| 5,101,478 | 3/1992 | Fu et al. | 395/821 |
| 5,121,479 | 6/1992 | O'Brien | 395/250 |
| 5,155,843 | 10/1992 | Stamm et al. | 395/182.03 |
| 5,197,144 | 3/1993 | Edenfield et al. | 395/470 |
| 5,218,711 | 6/1993 | Yoshida | 395/800 |
| 5,220,312 | 6/1993 | Lumelsky et al. | 345/190 |

FOREIGN PATENT DOCUMENTS

| | | |
|---|---|---|
| 0141743A2 | 10/1984 | European Pat. Off. |
| 0173515A2 | 8/1985 | European Pat. Off. |
| 0380846A2 | 7/1989 | European Pat. Off. |

OTHER PUBLICATIONS

*Microsoft Press Computer Dictionary*, Microsoft Press, 2nd ed., 1993 p. 419.
*Microsoft Press® Computer Dictionary*, 2nd ed., pp. 58–59.

Primary Examiner—Tod R. Swann
Assistant Examiner—James Peikari
Attorney, Agent, or Firm—Blakely Sokoloff Taylor & Zafman

[57] ABSTRACT

The present invention operates within a data processing system including a processor coupled to a memory controller unit which is coupled to memory used for storing and retrieving data. The memory controller unit provides separate read and write data pipelines, allowing write operations to overlap preceding read operations. The present invention selectively delays a certain limited number of write operations, delaying a write operation only if it is directed to the same memory address as that of a preceding read operation. By delaying this limited number of write operations, the present invention substantially preserves the advantages of write overlap while preventing the problem of overwrite. An alternative embodiment of the present invention selectively suppresses error writeback operations associated with a read operation if the read operation is followed by a write operation to the same address.

13 Claims, 4 Drawing Sheets

MEMORY ACCESS SYSTEM WITH OVERWRITE PREVENTION FOR OVERLAPPING WRITE OPERATIONS

This is a continuation of application Ser. No. 08/646,002 filed May 7, 1996, now abandoned, which is a continuation of application Ser. No. 08/350,720, filed Dec. 7, 1994, now abandoned, which is a continuation of application Ser. No. 07/809,667, filed Dec. 18, 1991, now abandoned.

BACKGROUND OF THE INVENTION

1. Field of the Invention

The present invention relates to the field of computer memories, and more particularly, to an apparatus and method for advantageously providing memory operation overlap without the problem of overwrite.

2. Art Background

Data processing systems typically store and retrieve data in memory. The storage of data is commonly accomplished through the use of a write operation directed to a particular address in memory, and involves the passing of data from a processor to memory. The retrieval of data is commonly accomplished through the use of a read operation directed to a particular address in memory, and involves the passing of data from memory to a processor.

Read and write operations can advantageously be managed by a memory controller unit disposed between the processor and memory. Such a memory controller unit can also provide what are referred to as data "pipelines." In particular, separate read and write pipelines can be provided such that a read pipeline through which read data is passed from the memory to the processor is separate from a write pipeline through which write data is passed from the processor to the memory. A memory controller unit having separate read and write pipelines allows for "write overlap" wherein a write operation is started prior to the conclusion of a preceding read operation. In write overlap, a write operation is initiated by the memory controller unit in the later stages of a preceding read operation at a time when the read data is still proceeding through the separate read pipeline. The use of write overlap is generally desirable because it increases the overall speed of the data processing system.

The unlimited use of write overlap, however, presents a problem when an overlapping write operation is directed to the same memory address as the preceding read operation, and a correctable bit error in the preceding read operation necessitates a writeback operation to that memory address. Under these circumstances, the writeback operation improperly occurs after the overlapping write operation writes data to the memory address. The writeback operation, therefore, improperly overwrites the newly written data. As will be described, the present invention advantageously provides for write overlap while preventing the problem of overwrite.

SUMMARY OF THE INVENTION

The present invention operates within a data processing system having a processor, memory, and a memory controller. The memory controller, coupled between the processor and the memory, provides separate data pipelines for data read from the memory and data written to the memory. In general, the memory controller thereby permits write operations to overlap read operations. The memory controller further provides for writeback operations in the event a correctable error is detected in the data which is being read from memory.

The presently preferred embodiment of the invention prevents the problem of "overwrite" by delaying certain write operations. The memory address to which a read operation is directed is first stored for comparison. This memory address is then compared to the memory address to which a succeeding write operation is directed. If the two addresses are equivalent, a write wait counter is loaded with a predetermined first value and decremented with each clock cycle. The succeeding write operation is not initiated until the write wait counter reaches a predetermined second value. The succeeding write operation is thereby delayed by a predetermined amount of time, rather than overlapped, in order to prevent the possibility of improper "overwrite." An alternative embodiment of the present invention resolves the problem of "overwrite," by suppressing writeback operations for read operations followed by write operations to the same address, rather than delaying these write operations. Thus, the present invention provides for write overlap, and writeback, while preventing the the problem of "overwrite."

BRIEF DESCRIPTION OF THE DRAWINGS

Further details are explained below with the help of the examples illustrated in the attached drawings in which.

DETAILED DESCRIPTION OF THE INVENTION

A memory controller apparatus and method is disclosed having application for use in a data processing system. In particular, the present invention is applicable to the data processing system described in the copending application Ser. No. 07/554,283, filed Jul. 17, 1990, now U.S. Pat. No. 5,283,877 incorporated fully herein, by reference. This application discloses an improved single in-line memory module (SIMM) employing dynamic random access memories (DRAMs) having particular application for use by a digital computer for storing and retrieving data and programs. While the present invention will be described at least partly within the context of this particular data processing system, it will be appreciated by one skilled in the art that the present invention may be used in a variety of data processing systems.

In the following description, for purposes of explanation, numerous details are set forth such as specific memory sizes, data paths, etcetera, in order to provide a thorough understanding of the present invention. However, it will be apparent to one skilled in the art that these specific details are not required in order to practice the present invention. In other instances, well known electrical structures and circuits are shown in block diagram form in order not to obscure the present invention unnecessarily.

Figure 1:
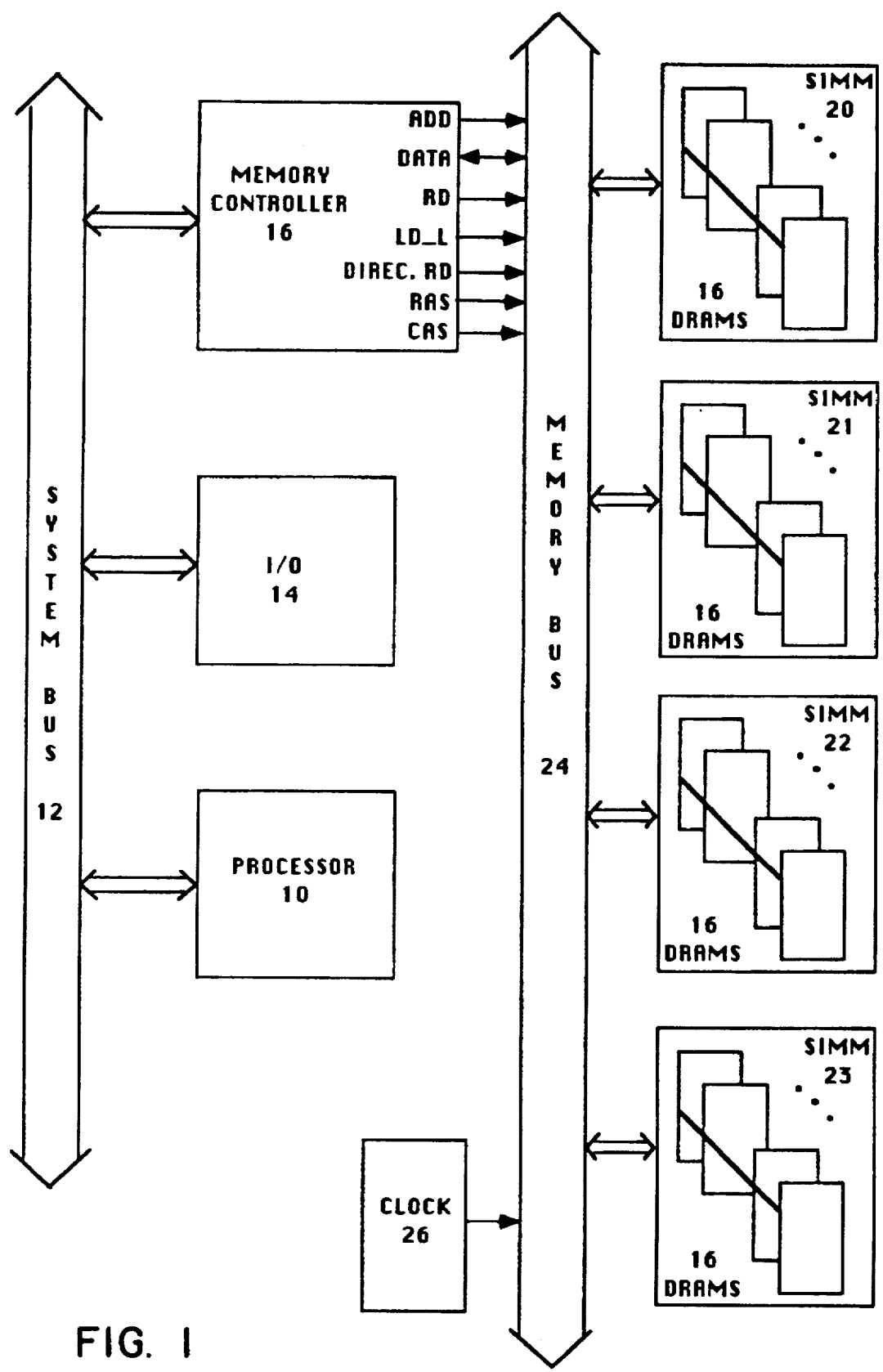
FIG. 1 is a functional block diagram of one possible data processing system employing the teachings of the present invention.

FIG. 1 illustrates one possible data processing system in which the teachings of the present invention may be utilized. A processor 10 is coupled to a system bus 12 for communicating with various system components, including input/output devices 14, and a memory controller 16. The processor 10 stores and retrieves data, which may comprise programs and/or alphanumeric and other data, in single in-line memory modules (SIMMs) 20, 21, 22, and 23. Each of these SIMMs 20-23 includes sixteen dynamic random access memories (DRAMs). As illustrated, SIMMs 20-23 communicate with the memory controller 16 over a memory bus 24. In addition, a clock 26 provides timed digital clock signals over memory bus 24 to the SIMMs 20 through 23. Although FIG. 1 illustrates four single in-line memory modules coupled to memory bus 24, it will be appreciated by one skilled in the art that the present invention may be used in a data processing system with any number of SIMMs.

In operation, the processor 10 issues read and write commands over the system bus 12, which in turn, couples the commands to the memory controller 16. In a read operation, data is coupled from the SIMMs to the memory controller 16 over memory bus 24, and the memory controller 16 then couples the data to the system bus 12 to be read. In a write operation, data is coupled to the memory controller 16 over the system bus 12, and the memory controller 16 then couples the data to the SIMMs over the memory bus 24. Various control signals are provided by the memory controller 16 to accomplish storage of data, retrieval of data, and refreshment of the DRAMs within the SIMMs. In particular, the memory controller 16 provides row address strobes (RAS), column address strobes (CAS), and load pulses (LD_L) for the DRAMs disposed in the SIMMs, as well as other timing signals associated with the storage and retrieval of data in the SIMMs.

Figure 2:
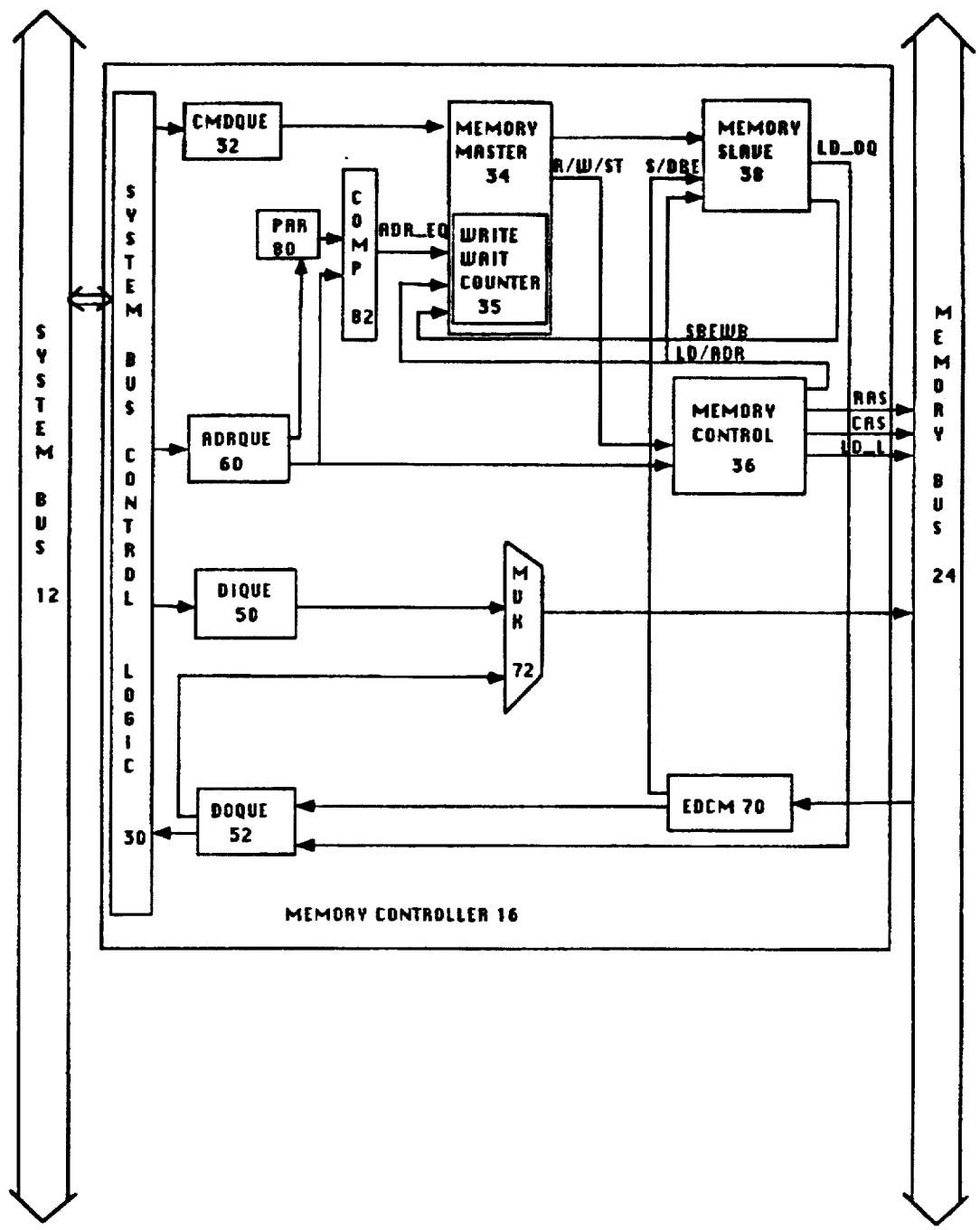
FIG. 2 is a functional block diagram of the modules and queues within the memory controller relevant to the present invention.

The write overlap with overwrite prevention system of the present invention will now be described. FIG. 2 illustrates a functional block diagram of the modules and queues in the memory controller 16 relevant to the present invention. In general, system bus 12 is coupled to memory controller 16 through system bus control logic 30. In particular, memory operation commands which have been coupled to the system bus 12 are coupled to the memory controller 16 through system bus control logic 30. System bus control logic 30 couples the memory operation commands to a memory operation command queue (CMDQUE) 32. Data which has been coupled to the system bus 12, for example in a write operation, is similarly coupled through system bus control logic 30 to a data-in queue (DIQUE) 50. Memory addresses which have been coupled to the system bus 12 are coupled through system bus control logic 30 to an address queue (ADRQUE) 60. Data which has been coupled to the memory bus 24, for example in a read operation, is coupled to a data-out queue (DOQUE) 50, which in turn, couples the data through the system bus control logic 30, to the system bus 12.

Memory controller 16 further includes a memory master module 34, a memory slave module 38, and a memory control module 36. The memory master module 34 embodies a state machine and is the master controller for executing memory operations (read operations, as will be described, are monitored by the memory slave module 38). The memory master module 34 is coupled to the memory operation command queue 32, which provides the memory master module 34 with memory operation commands. The memory master module 34 includes a write-wait counter (WWC) 35. The write wait counter 35, as will be described, selectively causes certain write operations to wait for a specified period of time before proceeding.

The memory slave module 38 embodying a state machine contains logic for monitoring and controlling read operations. This logic is separate from the memory master module 34 in order to allow overlap between a read operation and subsequent memory operations. The memory slave module 38 controls the course of a read operation by issuing control signals to the data-out queue (DOQUE) 52. Another major task of the memory slave module 38 is to handle memory errors detected by an error detection and control module 70. The error detection and correction module 70 receives data being read from the memory over the memory bus 24. As will be described, if the error detection and correction module 70 determines that an error has occurred, it couples an error control signal to the memory slave module 38.

Both the memory master module 34 and the memory slave module 38 are coupled to a memory control module 36. The memory control module 36 provides the timing signals, RAS, CAS, and LD_L over memory bus 24 to the DRAMs in the SIMMs (See FIG. 1.) In addition, memory control module 36 provides timing signals to the memory master module 34 and the memory slave module 38, thereby controlling the timing of the state machines in these modules.

The general operation of the present invention will now be described. In the case of a read operation, a read command is coupled from the system bus 12, through the system bus control logic 30, to the memory operation command queue (CMDQUE) 32. The particular memory address to be read is coupled from the system bus 12, through the system bus control logic 30, to the address queue (ADRQUE) 60. As will be explained, in read operations, this particular memory address is captured in a prior address register (PAR) 80 for comparison with the memory address of an immediately following write operation. The memory operation command queue 32 couples the read command to the memory master module 34, which in response, couples a control signal to the memory control module 36 to activate the timing signals needed for this read operation. The address queue 60 provides the memory address for the read operation to the memory control module 36.

Data which is to be read from the memory is then placed on the memory bus 24. From memory bus 24, the data is coupled to the error detection and control module 70, which detects single and double bit errors. Assuming no error is detected, the data is then coupled to the data-out queue (DOQUE) 52, which in turn, couples the data to the system bus 12. Assuming either a single or double bit error is detected, error detection and control module 54 provides, respectively, either an SBE or a DBE control signal to the memory slave module 38. If the bit error is correctable, as in the case of a single bit error, the data is corrected and a writeback operation is initiated. In particular, memory slave module 38 provides an SBEWB control signal to the memory master module 34, requesting a writeback. In response, memory master module 34 provides a control signal to memory control module 36 to activate the timing signals needed for the writeback. The data to be written back is then coupled from the data out queue 52, through a multiplexor 72, to the memory bus 24 under the control of the memory slave module 38, and the timing signals from memory control module 36.

In the case of a write operation, the write command is coupled from the system bus 12, through the system bus control logic 30, to the memory operation command queue (CMDQUE) 32. The particular memory address to be written to is coupled from the system bus 12, through the system bus control logic, to the address queue (ADRQUE) 60. The memory operation command queue 32 couples the write command to the memory master module 34, which in response, couples a control signal to the memory control module 36 to activate the timing signals needed for the write operation. The address queue 60 also couples to the memory control module 36 the memory address to be written to. Data to be written to the memory is coupled from the system bus 12 to the data-in queue (DIQUE) 50. The data is then coupled through the multiplexor 72 to the memory bus 24.

From the preceding description, it will be appreciated that data essentially flows through two pipelines in the memory controller 16. Data which is to be read from the memory flows from the memory bus 24, through the error detection and correction module 70, through the data out queue 52, to the system bus 12. Data which is to be written to the memory, flows from the system bus 12, to the data-in queue 50, through multiplexor 54, to the memory bus 24. By providing two distinct data pipelines, the memory controller 16 allows for a degree of overlap in memory operations. In particular, a write operation can be overlapped over a preceding read operation. For example, once the last word of read data has cleared the memory bus 24 and been coupled to the memory controller 16, a write operation can be advantageously initiated by the memory master module 34 and utilize the write pipeline. In this fashion, when a write operation follows a read operation, the early cycles of the write operation can overlap the later cycles of the read operation. This write overlap advantageously increases the overall speed of the data processing system.

As described earlier, however, the unlimited use of write overlap presents a problem when an overlapping write operation is directed to the same memory address as the preceding read operation, and a correctable bit error in the preceding read operation necessitates a writeback operation to that particular memory address. Under these circumstances, the writeback operation improperly occurs after the overlapping write operation writes data to the memory address, and as a result, the writeback operation improperly overwrites the newly written data.

The presently preferred embodiment of the invention remedies this overwrite problem by capturing the memory address of a read operation in the prior address register (PAR) 80. When a write operation follows a read operation, the memory address for the write operation is compared with the memory address for the previous read operation stored in the prior address register 80. This comparison is made with a comparator such as comparator 64. In the event that the memory addresses are equivalent, comparator 64 couples an ADR_EQ control signal to the memory master module 34. In response, the memory master module 34 delays the initiation of the write operation for a period of time, corresponding in general to the amount of time needed to complete the previous read operation.

More specifically, in response to an ADR_EQ control signal, the memory master module 34 loads write wait counter 35 with a predetermined first value. The write-wait counter 35 is thereafter decremented with each clock cycle until a predetermined second value is reached. The memory master module 34 will not initiate the succeeding write operation until the write wait counter 35 reaches this predetermined second value. The predetermined first value is generally chosen such that the amount of time it takes to decrement the write wait counter from this predetermined first value to the predetermined second value corresponds to the amount of time needed to complete the read operation. The write wait counter 35 thus delays the initiation of the succeeding write operation and precludes the possibility of any potential improper overwrite.

In the presently preferred embodiment, the write wait counter 35 counts from a predetermined first value down to a predetermined second value of zero. It will be appreciated, however, that the present invention is not in any way limited to this particular predetermined second value. It will further be appreciated that a substantial number of write operations which follow read operations will not be to the same memory address. Therefore, the present invention provides for substantial write overlap, while delaying only a limited number of write operations.

An alternative emobodiment of the present invention suppresses error writeback operations for read operations which are followed by write operations to the same address. As in the preferred embodiment, when a write operation follows a read operation, the memory address for the write operation is compared with the memory address for the previous read operation stored in the prior address register 80. In the event that the memory addresses are equivalent, comparator 64 couples an ADR_EQ control signal to the memory master module 34. In this alternative embodiment, however, rather than delay the succeeding write operation for a period of time using a write wait counter, the memory master module 34 contains logic such that it suppresses any error writeback requested with respect to the preceding read operation. As discussed previously, when a correctible error is discovered, memory slave module 38 provides an SBEWB control signal to the memory master module 34, requesting an error writeback. In this alternative embodiment, in the event of an equivalency between the memory address for a read operation and a succeeding write operation, memory master module 34 simply does not grant this writeback request, thereby effectively suppressing any such request. Thus, it will be appreciated that this alternative embodiment precludes the possibility of an improper overwrite.

Figure 3:
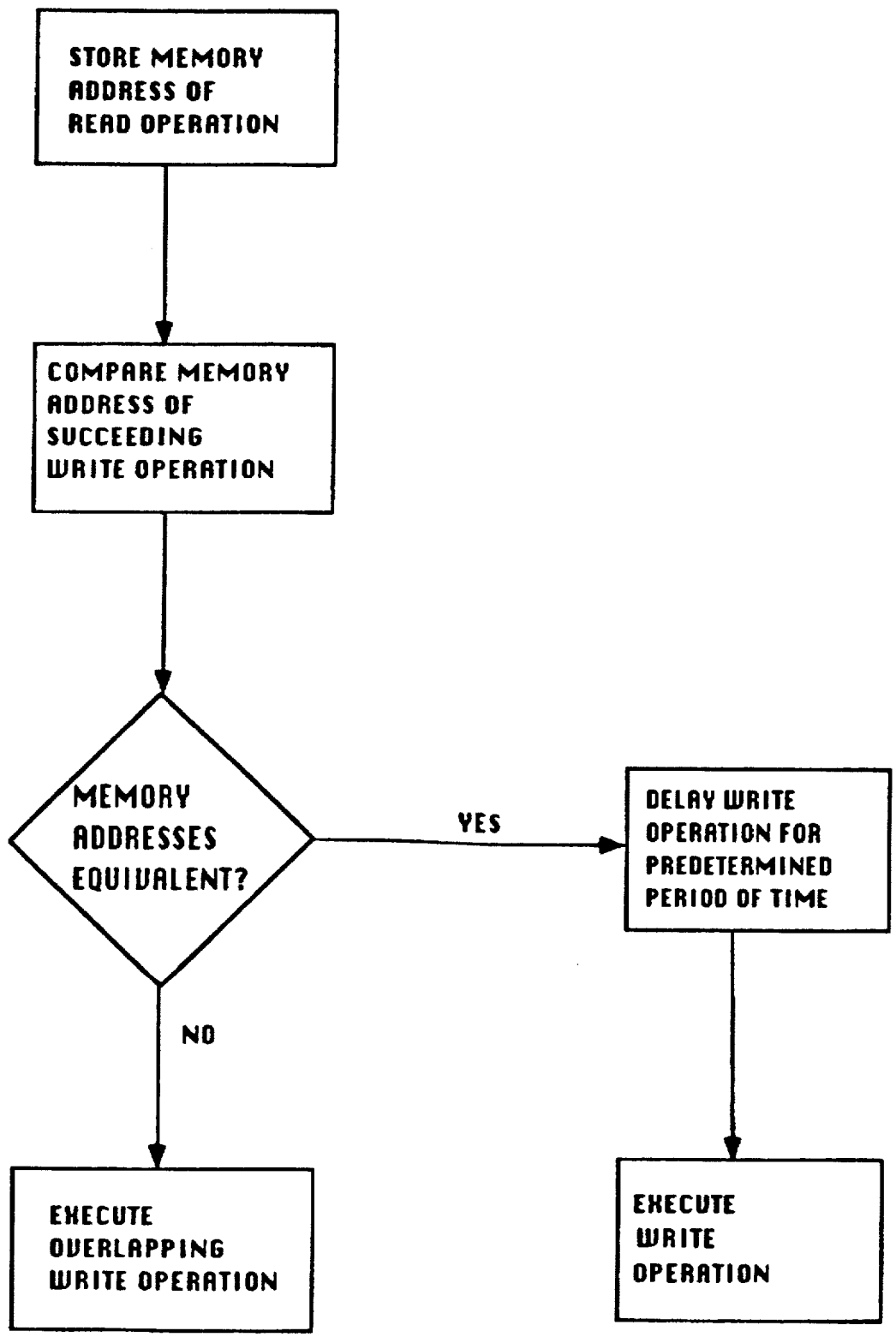
FIG. 3 is a flow chart illustrating the method of the presently preferred embodiment.

FIG. 3 is a flowchart illustrating the method of the preferred embodiment of the present invention. Initially, the memory address of a read operation is stored for comparison. The memory address of a succeeding write operation is compared to the stored memory address of the read operation. If the two addresses are equivalent, a write wait counter is loaded with a first predetermined value, and the write operation is delayed until the write wait counter reaches a second predetermined value. If the two addresses are not equivalent, the write operation proceeds without delay, overlapping the read operation.

Figure 4:
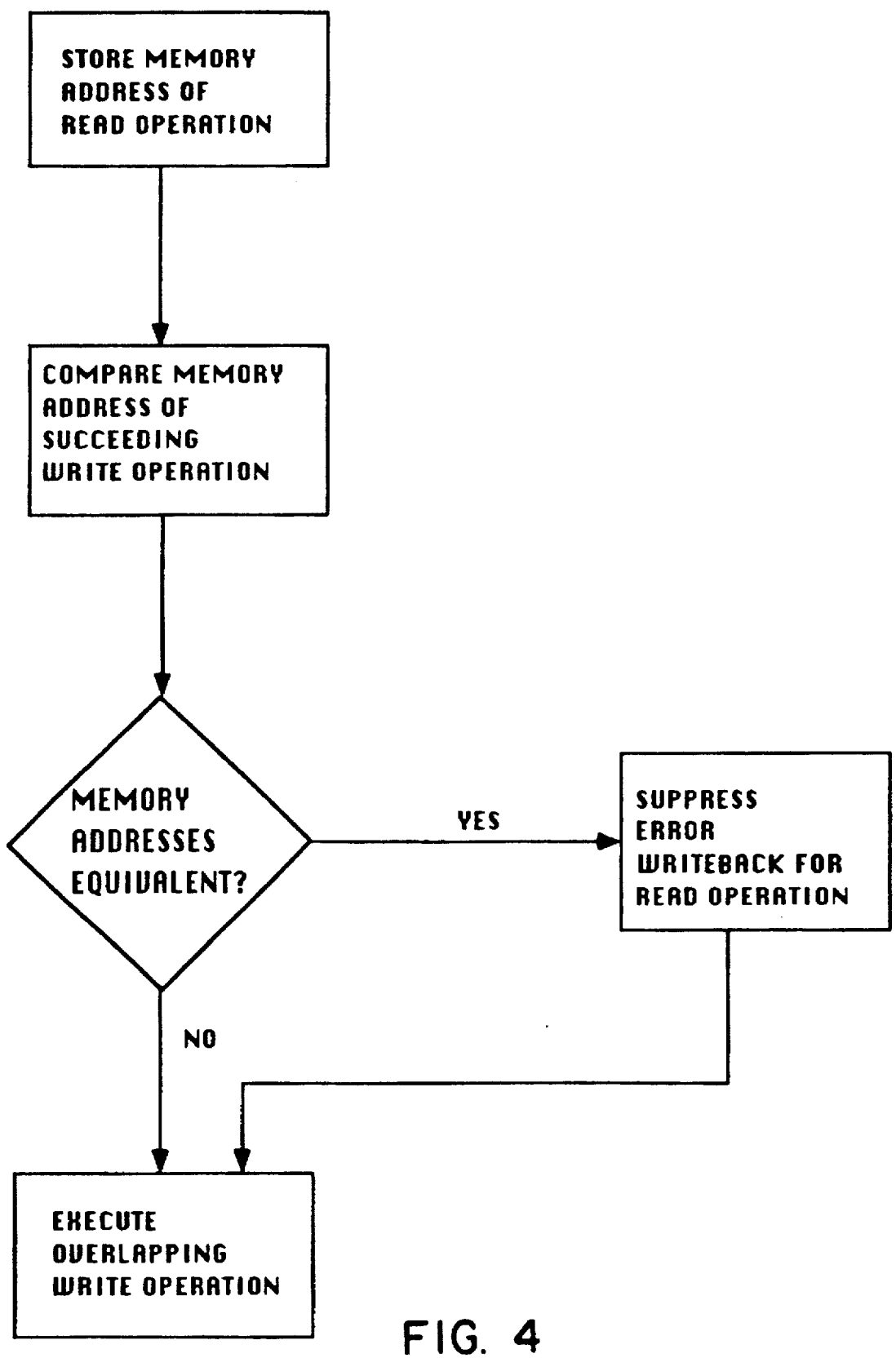
FIG. 4 is a flow chart illustrating the method of the alternative embodiment.

FIG. 4 is a flowchart illustrating the method of the previously described alternative embodiment of the present invention. Initially, the memory address of a read operation is stored for comparison. The memory address of a succeeding write operation is compared to the stored memory address of the read operation. If the two addresses are equivalent, error writeback for the read operation is suppressed and write overlap proceeds. If the two addresses are not equivalent, the write operation proceeds without delay, overlapping the read operation, and error writeback is allowed.

While the present invention has been particularly described with reference to FIGS. 1 through 4 and with emphasis on certain memory system architectures, it should be understood that the figures are for illustration only and should not be taken as limitations upon the invention. In addition, it is clear that the methods and apparatus of the present invention have utility in any of a number of data processing systems. It is contemplated that many changes and modifications may be made, by one of ordinary skill in the art, without departing from the spirit and scope of the invention as disclosed above.

I claim:

1. A data processing system having write overlap with overwrite prevention comprising:

a processor;

memory for storing and retrieving data;

a memory bus coupled to said memory;

a system bus coupled to said processor; and memory controller means coupled to said processor over said system bus and to said memory over said memory bus for providing memory addresses, data, and control signals for read, write, and error-writeback operations from and to said memory, said memory controller including:

means for detecting bit errors in data read from said memory, and for controlling error-writeback operations to said memory;

means for initiating a write operation prior to the completion of a preceding read operation; and, means for preventing overwrite from occurring.

2. The data processing system having write overlap with overwrite prevention provided in claim 1, wherein said means for preventing overwrite from occurring comprises:

means for selectively delaying initiation of a write operation upon the occurrence of a predetermined condition.

3. The data processing system having write overlap with overwrite prevention provided in claim 2, wherein said write operation is initiated prior to the completion of said preceding read operations and immediately after the last word of read data has cleared said memory bus and been coupled to said memory controller.

4. A data processing system having write overlap with overwrite prevention as provided in claim 2, wherein said means for selectively delaying initiation of a write operation upon the occurrence of a predetermined condition includes:

a write wait counter for counting from a first predetermined value to a second predetermined value.

5. A data processing system having write overlap with overwrite prevention as provided in claim 4, wherein said means for selectively delaying initiation of a write operation upon the occurrence of a predetermined condition delays said write operation until said write counter reaches said second predetermined value.

6. A data processing system having write overlap with overwrite prevention as provided in claim 2, wherein said means for selectively delaying initiation of a write operation upon the occurrence of a predetermined condition further includes:

a comparator for comparing a memory address for said write operation with a memory address for said preceding read operation.

7. A data processing system having write overlap with overwrite prevention as provided in claim 6, wherein said predetermined condition includes equivalency between said memory address for said write operation and said memory address for said preceding read operation.

8. The data processing system having write overlap with overwrite prevention provided in claim 1, wherein said means for preventing overwrite from occurring comprises:

means for selectively suppressing initiation of error-writeback operations upon the occurrence of a predetermined condition.

9. The data processing system having write overlap with overwrite prevention provided in claim 8, wherein said means for selectively suppressing initiation of certain error-writeback operations upon the occurrence of a predetermined condition includes:

a comparator for comparing a memory address for said write operation with a memory address for said preceding read operation.

10. The data processing system having write overlap with overwrite prevention provided in claim 9, wherein said predetermined condition includes equivalency between said memory address for said write operation and said memory address for said preceding read operation.

11. A method of preventing overwrite in a data processing system with write overlap having a processor, memory, and a memory controller for controlling memory operations including read, write, and error-writeback operations directed to memory addresses, said method comprising the step of:

detecting a bit error in data read from memory during a read operation;

initiating an error-writeback operation during said read operation;

comparing a memory address for a write operation with a memory address for said read operation, said read operation preceding said write operation;

utilizing a result of said comparison in order to prevent overwrite from occurring.

12. The method of providing write overlap while preventing overwrite as provided in claim 11, wherein said utilizing step comprises:

delaying said write operation when said comparison yields equivalency between said memory address for said write operation and said memory address for said preceding read operation to allow time for said error-writeback operation to complete writing to memory.

13. The method of providing write overlap while preventing overwrite as provided in claim 11, wherein said utilizing step comprises:

suppressing said error-writeback operation for said preceding read operation when said comparison yields equivalency between said memory address for said write operation and said memory address for said preceding read operation.

* * * * *